(12) United States Patent
Ferraris et al.

(10) Patent No.: US 12,084,532 B2
(45) Date of Patent: *Sep. 10, 2024

(54) PISTON SYSTEM AND HIGH PRESSURE HOMOGENIZER USING THE PISTON SYSTEM

(71) Applicant: SABIC GLOBAL TECHNOLOGIES B.V., Bergen op Zoom (NL)

(72) Inventors: Dane M. Ferraris, Geleen (NL); Richard Legg, Geleen (NL); Ahmed Abouelfetouh Youssef, Geleen (NL); Vern Lowry, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 120 days.

This patent is subject to a terminal disclaimer.

(21) Appl. No.: 17/879,941

(22) Filed: Aug. 3, 2022

(65) Prior Publication Data

US 2022/0370969 A1    Nov. 24, 2022

Related U.S. Application Data

(63) Continuation of application No. 16/762,312, filed as application No. PCT/EP2018/080476 on Nov. 7, 2018, now Pat. No. 11,447,592.

(30) Foreign Application Priority Data

Nov. 7, 2017   (EP) ..................................... 17200372

(51) Int. Cl.
*F04B 15/02*   (2006.01)
*B01F 25/44*   (2022.01)
(Continued)

(52) U.S. Cl.
CPC ............ *C08F 279/02* (2013.01); *B01F 25/44* (2022.01); *B01F 25/4512* (2022.01);
(Continued)

(58) Field of Classification Search
CPC .......... F04B 15/02; F04B 53/02; F04B 53/08; F04B 53/164; F04B 53/18; C08F 279/02;
(Continued)

(56) References Cited

U.S. PATENT DOCUMENTS 3,573,246 A    3/1971  Bennett
3,742,822 A *  7/1973  Talbert .................. F04B 53/164
                                                            92/168

(Continued)

FOREIGN PATENT DOCUMENTS

DE   102014104050 A1   9/2015
EP       2592268 A1   5/2013

OTHER PUBLICATIONS

European Search Report for European Application No. 17200372.5 dated May 11, 2018, 5 pages.
(Continued)

*Primary Examiner* — Kenneth J Hansen
(74) *Attorney, Agent, or Firm* — CANTOR COLBURN LLP

(57) ABSTRACT

The invention relates to a piston system (1) for use in a homogenizer, comprising a piston (2) that is configured and arranged to make a reciprocating movement in use of the piston system, a cylinder (3) that is configured and arranged to receive and guide at least a first part of the piston, a first supply channel (8) that is configured and arranged to supply a lubricating medium (9) to a portion (10) of the first part of the piston that in use is arranged inside the cylinder, and a second supply channel (13) that is configured and arranged to, in use, supply a cooling medium (14) to a second part of
(Continued)

the piston outside the cylinder. Also disclosed is a process for the production of an elastomer agglomerate composition forcing a slurry comprising elastomeric particles through an aperture to obtain the elastomer agglomerate composition using the piston system.

18 Claims, 3 Drawing Sheets

(51) Int. Cl.

| | |
|---|---|
| *B01F 25/451* | (2022.01) |
| *B01F 101/00* | (2022.01) |
| *C08F 279/02* | (2006.01) |
| *F04B 53/08* | (2006.01) |
| *F04B 53/16* | (2006.01) |
| *F04B 53/18* | (2006.01) |

(52) U.S. Cl.
CPC ............. *F04B 15/02* (2013.01); *F04B 53/08* (2013.01); *F04B 53/162* (2013.01); *F04B 53/18* (2013.01); *B01F 2101/2805* (2022.01); *B01F 2215/0431* (2013.01)

(58) Field of Classification Search
CPC .............. B01F 25/44; B01F 2010/2805; B01F 2215/0431; F16J 1/08; F01P 3/06; F01P 3/08
See application file for complete search history.

(56) References Cited

U.S. PATENT DOCUMENTS

| | | | |
|---|---|---|---|
| 3,749,529 A | | 7/1973 | Cornelsen |
| 4,086,029 A | * | 4/1978 | Crane ................ F16J 15/40 417/437 |
| 2004/0244576 A1 | | 12/2004 | Kugelev et al. |
| 2008/0193299 A1 | | 8/2008 | Oglesby |
| 2011/0271831 A1 | | 11/2011 | Gee, Jr. |

OTHER PUBLICATIONS

International Search Report for International Application No. PCT/EP2018/080476, International Filing Date Nov. 7, 2018, Date of Mailing Feb. 18, 2019, 4 pages.
Written Opinion for International Application No. PCT/EP2018/080476, International Filing Date Nov. 7, 2018, Date of Mailing Feb. 18, 2019, 6 pages.

* cited by examiner

PISTON SYSTEM AND HIGH PRESSURE HOMOGENIZER USING THE PISTON SYSTEM

CROSS REFERENCE TO RELATED APPLICATIONS

This application is a continuation of U.S. application Ser. No. 16/762,312, filed on May 7, 2020, which is a National Stage application of PCT/EP2018/080476, filed Nov. 7, 2018, which claims the benefit of European Application No. 17200372.5, filed Nov. 7, 2017, all of which are incorporated by reference in their entirety herein.

The present invention relates to a piston system. The present invention further relates to a process for the production of an elastomer agglomerate composition using such piston system.

In the field of thermoplastic copolymers, certain copolymers comprising one or more elastomeric phase(s) and one or more thermoplastic phase(s) are known to have significant commercial and technical value. The presence of such multiple phases provides a means for introduction of desirable properties of the materials present in each of the phases into a single polymeric system. Such copolymers may have a very desirable balance of properties, rendering them useful for conversion into a wide variety of applications. For example, such copolymers may exhibit a desirable balance of material properties such as: mechanical properties, including a desirable impact strength, tensile strength and flexural modulus; thermal properties such as heat deflection temperature; processing properties such as mouldability via injection moulding; and optical properties such as surface gloss and scratch resistance.

Such copolymers comprising one or more elastomeric phase(s) and one or more thermoplastic phase(s) may for example be core-shell copolymers. In the context of the present invention, core-shell copolymers may be understood to be copolymers comprising elastomeric particles dispersed in a matrix of a thermoplastic material, in particular copolymers comprising elastomeric particles dispersed in a matrix of a thermoplastic material where a certain portion of the thermoplastic material is chemically bound to the surface of the elastomeric particles.

Such core-shell copolymers may for example be produced by reacting certain elastomeric particles with certain monomers, in which the monomers both react to form a thermoplastic material as well as react with the elastomeric particles to form polymeric structures of the thermoplastic material that are chemically bound to the elastomeric particles. This ensures that the thermoplastic material forming a thermoplastic phase is compatible with the elastomeric phase. Such compatibility may be understood as to allow for melt processing without phase separation of the elastomeric phase(s) and the thermoplastic phase(s) taking place.

A well-known type of a core-shell copolymers that may be produced using elastomeric particles according to the present invention are acrylonitrile-butadiene-styrene copolymers, further also referred to as ABS copolymers. Such ABS copolymers may be produced by for example emulsion polymerisation processes where polybutadiene particles act as the elastomeric particles, which may react with a mixture comprising monomers including styrene and acrylonitrile to form an ABS copolymer.

Other examples of such core-shell copolymers include methacrylate butadiene styrene copolymers, acrylonitrile styrene butylacrylate copolymers, and styrene butylacrylate copolymers.

In order to achieve the desired balance of material properties of such core-shell copolymers, it is desirable that the elastomeric particles that are used in the production process of the core-shell copolymers have a certain average particle size. However, the processes for production of elastomers, such as for example polybutadiene, poly(styrene-butadiene), poly(acrylonitrile butadiene) and poly (butyl acrylate) commonly result in elastomeric particles having an average particle size that is below such desired average particle size.

Therefore, in order to obtain the elastomeric particles having the desirable average particle size for use in the production of core-shell copolymers such as ABS copolymers, there is a need to modify the elastomeric particles obtained from the processes for production of such elastomeric particles in a way that the average particle size is increased.

DE 10 2014 104 050 is directed reducing particle sizes. Disclosed is a homogenizing device for fluid substances with at least one homogenizing unit and a piston pump device assigned to the homogenizing unit is intended to enable a particularly reliable operation of the device. The particles in the homogenized product are smaller than in the starting product. The homogenized product is used for cooling.

There are several known methods of increasing the average particle size of such elastomeric particles. For example, the elastomeric particles may be subjected to a further polymerisation step using the monomer(s) that were used to form the initial elastomeric particles. This is known as the direct-growth approach. A disadvantage of this method is that the polymerisation time that is required to produce elastomeric particles having the desired average particle size for use in the production of core-shell copolymers according to the present invention is significantly longer.

A further method is by chemical agglomeration, such as by reacting the initial elastomeric particles with a chemical, for example acrylic acid, to produce chemically agglomerated elastomeric particles. However, a disadvantage of this method is that it may introduce impurities that may affect the final properties of the core-shell copolymers.

A third method to achieve elastomeric particles having a desired average particle size is by way of pressure agglomeration, wherein the initial elastomeric particles are subjected to a pressure of such nature that particles fuse to form an elastomer agglomerate composition. Such method can be relatively fast, and does not introduce any further impurities into the elastomeric particles. It is therefore a desirable method to increase the average particle size of elastomeric particles, particularly for the purpose of providing elastomeric particles suitable for use in the production of core-shell copolymers according to the present invention, such as ABS copolymers.

Pressure agglomeration method involves forcing a colloidal dispersion (also referred to as a slurry) comprising elastomeric particles through an aperture. For forcing the slurry through the aperture, a piston system is typically used. The reciprocating motion of a piston of the piston system causes friction which leads to wear of the components of the piston system, e.g. packing nuts, packing rings and resilient elements such as compression rings, requiring periodic changing of these components. In order to reduce the frequency of the change of the aforementioned components, the existing piston system has a supply channel for supplying any suitable cooling medium, e.g. water, to the piston for cooling the piston during use of the piston system. Although such piston system is satisfactory in some situations, there is a need in the art for a piston system which does not require a frequent maintenance.

Figure 1:
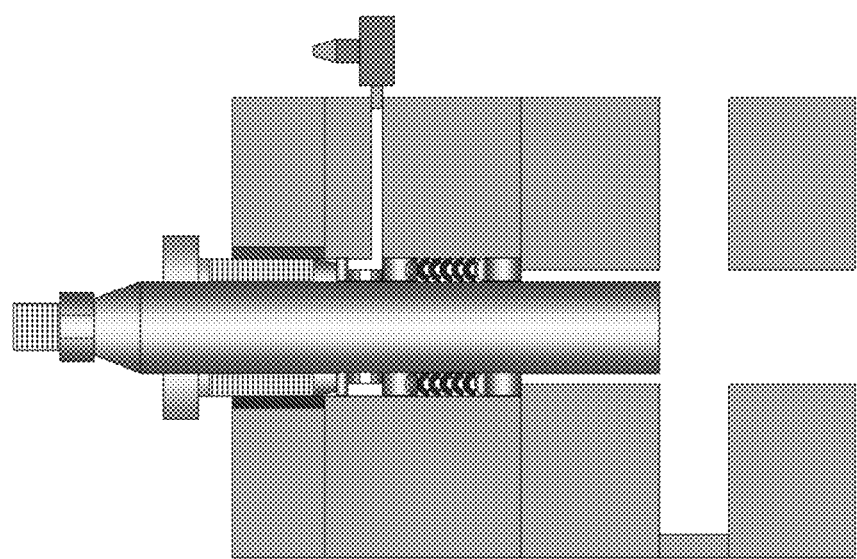
FIG. 1 is a schematic view of an example of a piston system for pressure agglomeration wherein water is used as both coolant and lubricant.

Disclosed herein is a piston system for use in a homogenizer (e.g., a high-pressure homogenizer) comprising:
a piston that is configured and arranged to make a reciprocating movement in use of the piston system,
a cylinder that is configured and arranged to receive and guide at least a first part of the piston,
a first supply channel that is configured and arranged to supply a lubricating medium to a portion of the first part of the piston that, in use, is arranged inside the cylinder, and
a second supply channel that is configured and arranged to, in use, supply a cooling medium to a second part of the piston outside the cylinder.

Also disclosed is a process for the production of an elastomer agglomerate composition comprising: forcing a slurry comprising elastomeric particles (preferably in water) through an aperture to obtain the elastomer agglomerate composition using the piston system or the high-pressure homogenizer. Preferably, the process is a continuous process.

The piston system can comprise a first supply channel that is configured and arranged to supply a lubricating medium, e.g. grease, to a portion of a first part of the piston that, in use, is arranged inside the cylinder. The piston system also comprises a second supply channel that is configured and arranged to supply, in use a cooling medium, e.g. water, to a second part of the piston when the second part of the piston is outside of the cylinder.

The piston system and method solves the problem which is particularly severe in the field of production of an elastomer agglomerate composition. In a process for the production of an elastomer agglomerate composition, a small amount of the slurry enters the small gap between the piston and the compression ring during operation. The slurry moved by the piston is sticky (e.g., it coagulates), unlike e.g. milk. The sticky nature of the slurry causes it to remain in the gap. This causes friction and a faster deterioration of components of the piston system, especially resilient components such as the compression ring. Further, the plugging of the system and the buildup of the sticky slurry cause a reduction in the production rate. This is a particularly serious problem when the process is a continuous process, in which the slurry comprising elastomeric particles in water is continuously forced through the aperture. The process can be subject to interruptions and can suffer from long downtime. Accordingly, the piston system disclosed herein is particularly useful for the production of an elastomer agglomerate composition, e.g., a sticky slurry.

The lubricating medium decreases friction. The reciprocating motion of the piston pulls back the lubricating medium as it moves out of the cylinder, and applies the lubricating medium over the length of the piston (over the first part, second part, and third part). The lubricating medium can be applied to the piston. As the second part of the piston moves out of the cylinder and away from the slurry chamber (see FIGS. 3 to 4), it pulls the lubricating medium away from the slurry chamber. As the piston reenters the chamber, the lubricating medium is applied to the second part of the piston.

The cooling medium, e.g. water, cools down the piston which has gained heat from the friction of the reciprocating motion. The amount of cooling medium that can be applied is not limited because the cooling medium is applied only to the second part of the piston. In use, the second part of the piston system extends out of and re-enters the cylinder.

The cooling medium is applied from an outlet of the second supply channel at a certain distance from the piston. The outlet of the second supply channel is located outside of the cylinder, hence the cooling medium exits the second supply channel outside of the cylinder. Hence, the cooling medium is applied to a portion of the piston that is outside of the cylinder. This improves the heat dissipation and ensures that the piston is always cooled as it re-enters the cylinder of the piston system with every reciprocation.

The supply of lubricating medium may be constant or intermittent. In some embodiments, the first supply channel comprises at least two inlet branches. A first inlet branch of the at least two inlet branches can be connected with a first lubricant supply system that is configured and arranged to enable manual supply of the lubricating medium. Manual supply of the lubricating medium can be used to ensure that a sufficient amount of lubricating medium is available prior to starting the reciprocating movement of the piston. A second inlet branch of the at least two inlet branches can be connected with a second lubricant supply system that is configured and arranged to enable automatic supply of the lubricating medium.

It is ensured that no lubricating medium gets into the product, although high pressure is employed. This prevents the contamination of the product as the lubricating medium is pushed in the opposite direction.

The invention is further elucidated with reference to embodiments illustrated in Figures ("FIGS.") 2-5. FIGS. 2-5 show a cross sectional view of an exemplary, non-limiting embodiment of the piston system 1. The piston system 1 comprises a piston 2 that is configured and arranged to make a reciprocating movement in use of the piston system 1 within a cylinder 3 that is configured and arranged to receive and guide at least a first part 15 of the piston 2. The cylinder 3 is provided with a packing nut 4 that is configured and arranged to snuggly accommodate the first part 15 of the piston 2. Furthermore, the cylinder 3 is provided with two (or more) packing rings 5, 6 that are configured and arranged to snuggly accommodate the first part 15 and third part 17 of the piston 2. A resilient element 7 that acts as a compression ring is arranged between the two packing rings 5, 6.

The piston system 1 shown in FIGS. 2-5 also comprises a first supply channel 8 that is configured and arranged to supply a lubricating medium 9, e.g. grease, to a portion 10 of the first part 15 of the piston 2 that in use is arranged inside the cylinder 3. The first supply channel 8 comprises two inlet branches 11, 12. The first inlet branch 11 is connected with a first lubricant supply system (31) that is configured and arranged to enable manual supply of the lubricating medium 9. The second inlet branch 12 is connected with a second lubricant supply system (32) that is configured and arranged to enable automatic supply of the lubricating medium 9.

The piston system 1 shown in FIGS. 2-5 furthermore comprises a second supply channel 13 that is configured and arranged to supply a cooling medium 14, e.g. water, to a second part 16 of the piston 2 that, in use of the piston system, moves out of and re-enters cylinder 3. In other words, the cylinder moves outside of the entire block and cooling medium is applied (e.g., sprayed) onto the piston 2. Preferably, the cooling medium is not part of a closed system, e.g., part of a cooling block. The slurry is not used as the cooling medium. The cooling medium and the slurry are different.

Figure 2:
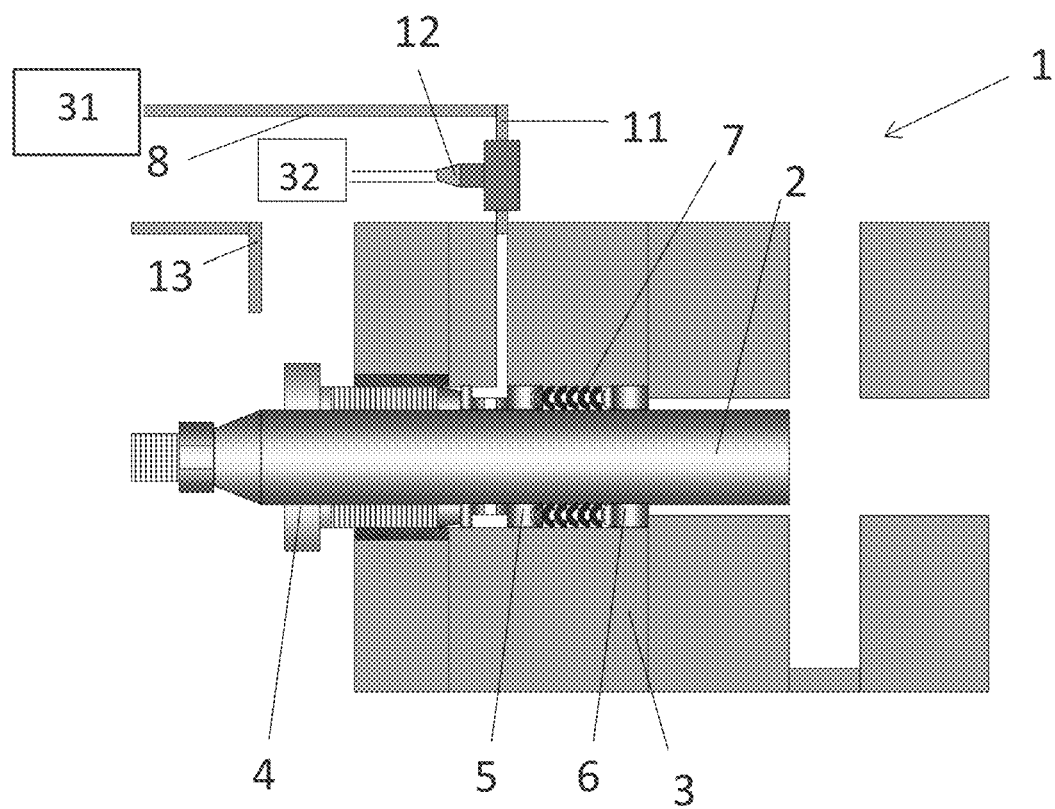
FIG. 2 is a schematic view of another example of a piston system for pressure agglomeration.

FIG. 2 shows a cross sectional view of the piston system 1 that is not in use.

Figure 3:
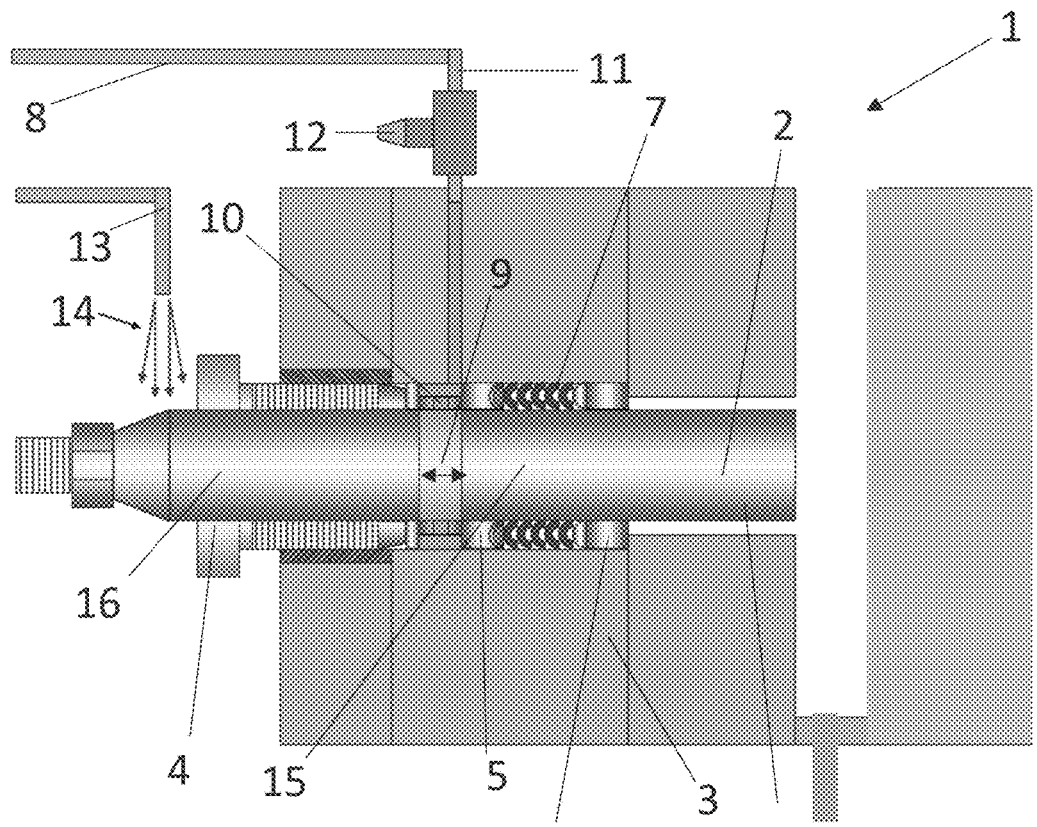
FIG. 3 is a schematic view of the piston system of FIG. 2 prior to starting the reciprocating movement of the piston.

FIG. 3 shows a cross sectional view of the piston system 1 prior to starting the reciprocating movement of the piston 2. The lubricating medium 9 can be manually supplied via the first inlet branch 11 of the first supply channel 8. In this way it is ensured that a sufficient amount of lubricating medium 9 is available prior to starting the reciprocating movement of the piston 2. The lubricating medium 9 is provided to a portion 10 of the first part of the piston 2 that is arranged inside the cylinder 3.

Furthermore, the cooling medium 14 is supplied to the second part 16 of the piston 2, e.g., when the second part 16 of the piston 2 is outside of the cylinder 3. This can be done either manually or automatically.

Figure 4:
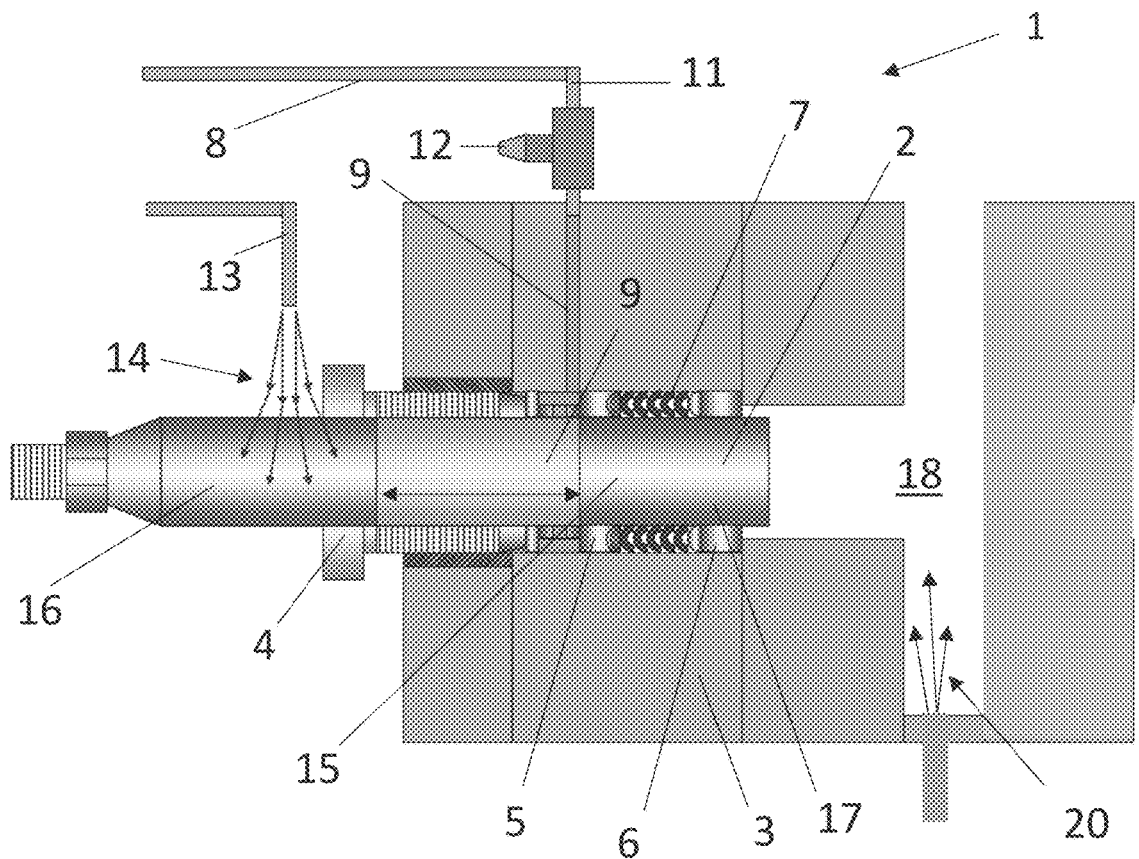
FIG. 4 is a schematic view of the piston system of FIG. 2 when the reciprocating movement of the piston is started and cooling medium is applied.

FIG. 4 shows a cross sectional view of the piston system 1 when the reciprocating movement of the piston 2 starts to move the piston back into the cylinder 3. The cooling medium 14 supplied by the second supply channel 13 flows over the second part 16 of the piston 2 when it exits the packing nut 4 and/or as it reenters the cylinder 3 past packing nut 4. In this way the piston 2 is cooled from heat gained from friction during operation. The cooling medium 14 can be supplied continuously or intermittently depending on the amount of heat that needs to be removed.

Furthermore, the lubricating medium 9 can be automatically supplied via the second inlet branch 12 of the first supply channel 8. The lubricating medium 9 can be supplied continuously or intermittently depending on the degree of lubrication that is required. Moreover, FIGS. 3 and 4 illustrate that the lubricating medium 9 that is provided to the portion 10 of the first part 15 of the piston 2 is spread out over the surface of the piston 2 in a direction of the packing nut 4, i.e. away from the elastomer agglomerate composition. This is illustrated by the area comprising the lubricating medium 9 in FIG. 3 versus the area comprising the lubricating medium 9 in FIG. 4, as is illustrated by the arrows. In this way contamination of the elastomer agglomerate composition with the lubricating medium 9 can be avoided.

Figure 5:
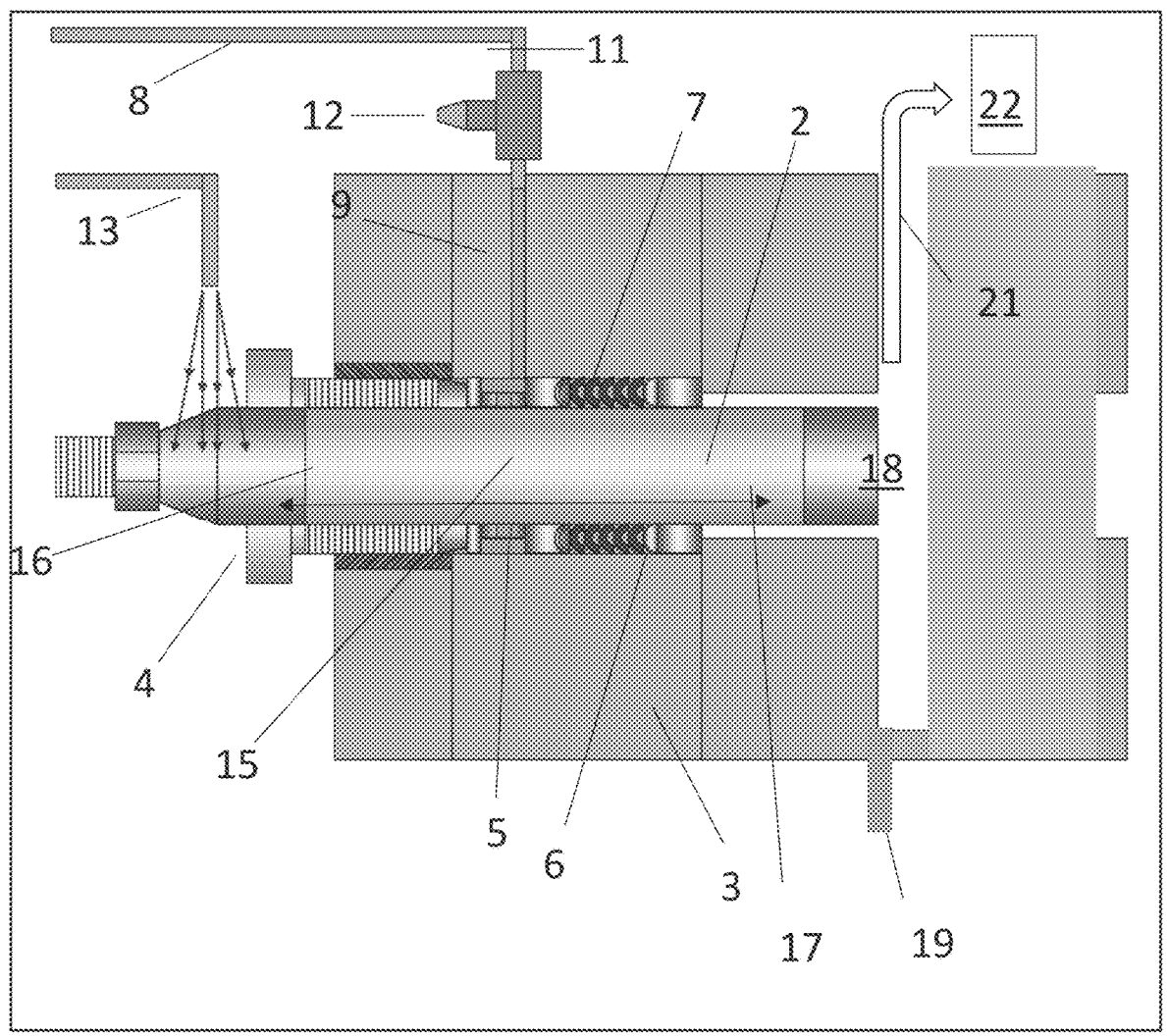
FIG. 5 is a schematic view of the piston system of FIG. 2 during operation with the piston stroke in, pushing the slurry through the aperture.

FIG. 5 shows a cross sectional view of the piston system 1 during operation. The cooling medium 14 flows over the second part of the piston 2 when it exits the packing nut 4 to remove heat gained from friction during operation.

The lubricating medium 9 is automatically supplied via the second inlet branch 12 of the first supply channel 8. The lubricating medium 9 can be supplied continuously or intermittently depending on the degree of lubrication that is required. Moreover, FIG. 5 shows that the lubricating medium 9 is spread out across the surface of the piston 2. However, the surface of the piston 2 extending from the second packing ring 6 to the end part of the piston 2 that comes into contact with the elastomer agglomerate composition remains substantially free from the lubricating medium 9. Hence, contamination of the elastomer agglomerate composition with the lubricating medium 9 can be avoided. Furthermore, if the lubricating medium is grease, it slings to the piston, inhibiting contamination.

The process for increasing the particle size of elastomeric particles comprises (a) providing a slurry comprising the elastomeric particles in water and (b) forcing the slurry through an aperture to obtain the elastomer agglomerate composition. In other words, a slurry supply 19 supplies a slurry 20 to a slurry chamber 18, preferably as the second part 16 of the piston exits the cylinder. As the piston reciprocates, the second part 16 of the piston reenters the cylinder, the third part of the piston 17 reenters the slurry chamber, pressurizing the slurry 20 and forcing the slurry out of the slurry chamber (arrow 21). The slurry 21 can be forced through an aperture 22 in a homogenizer 23 (e.g. a high pressure homogenizer) to form the elastomer agglomerate composition having larger particles sizes than the elastomeric particles in the slurry that entered the slurry chamber.

Slurry (e.g., a Colloidal Dispersion)

The elastomeric particles used in the process may comprise (or consist of) polybutadiene particles, poly(styrene butadiene) particles, poly(acrylonitrile butadiene) particles, polybutylacrylate particles, and combinations thereof. Preferably, the poly(styrene butadiene) particles comprise at least 50 wt %, at least 60 wt %, at least 70 wt %, at least 80 wt % or at least 90 wt % of units derived from butadiene.

Preferably, the elastomeric particles comprise (or consisting of) polybutadiene particles, poly(styrene butadiene) particles comprising at least 50 wt % of units derived from butadiene, poly(acrylonitrile butadiene) particles, polybutylacrylate particles, and combinations thereof. When the elastomeric particles comprise poly(styrene butadiene) particles, the poly(styrene butadiene) particles preferably comprise at least 60 wt %, at least 70 wt %, at least 80 wt % or at least 90 wt % of units derived from butadiene.

Preferably, the elastomeric particles are polybutadiene particles.

The elastomeric particles prior to homogenization preferably have an average particle size of at most 150 nm, more preferably at most 130 nm or even more preferably at most 120 nm, for example 80 to 120 nm. Use of such elastomeric particles has an advantage in that the need for lengthy polymerisation of the monomers to obtain the elastomeric particles is avoided. As used herein, the average particle size is understood to be the $D_{50}$ particle size as determined in accordance with ISO 9276-2:2014.

The particle size distribution of the elastomeric particles is not critical, but typically the volume fraction of particles with particle size smaller than 214 nm in the slurry is at least 90%.

The slurry may comprise at least 20 wt % of elastomeric particles, preferably at least 20 wt % and at most 70 wt %, more preferably at least 30 wt % and at most 60 wt %, even more preferably at least 30 wt % and at most 50 wt %, with regard to the total weight of the slurry.

Preferably, the slurry comprises at least 20 wt % of elastomeric particles, preferably at least 20 wt % and at most 70 wt %, more preferably at least 30 wt % and at most 60 wt %, even more preferably at least 30 wt % and at most 50 wt %, with regard to the total weight of the slurry, wherein the elastomeric particles consist of polybutadiene particles.

The slurry is preferably an aqueous emulsion. The slurry may further comprise an emulsifier for ensuring the slurry to be in the form of an aqueous emulsion. Such aqueous emulsion may also be referred to as a latex. For the avoidance of doubt, an emulsifier is herein not considered as a chemical agglomerant.

The amount of the emulsifier may e.g., be 0.05 to 15 wt %, preferably 0.1 to 10 wt %, 0.2 to 5 wt % or 0.5 to 3 wt %, with respect to a total weight of the slurry.

Examples of possible emulsifiers are those emulsifiers which are known to the skilled worker and are commonly employed as dispersants in the context of aqueous emulsion polymerization; such emulsifiers are described, for example, in Houben-Weyl, Methoden der organischen Chemie, Volume XIV/1, Makromolekulare Stoffe [Macromolecular substances], Georg-Thieme-Verlag, Stuttgart, 1961, pp. 411-420. Anionic, cationic and nonionic emulsifiers are possible. Preference is given to using anionic emulsifiers, and especially soaps. Examples of anionic emulsifiers E are the salts of $C_8$-$C_{18}$ fatty acids with alkali metals, such as Na and K, with ammonium, with volatile amines, such as triethylamine ethanolamine, diethanolamine, triethanolamine and morpholine, etc., and with divalent and trivalent cations, such as calcium, magnesium, aluminum, etc., for example. Examples of further anionic emulsifiers are alkali metal and ammonium salts of alkyl sulfates (alkyl: $C_8$-$C_{22}$), of sulfuric monoesters with ethoxylated alkanols (EO units: 2 to 50, alkyl: $C_{12}$-$C_{18}$) and ethoxylated alkylphenols (EO units: 3 to 50, alkyl: $C_4$-$C_9$), of alkylsulfonic acids (alkyl: $C_{12}$-$C_{18}$) and of alkylarylsulfonic acids (alkyl: $C_9$-$C_{18}$). Additional emulsifiers are given in Houben-Weyl, loc.cit. pp. 192-208). Preferred emulsifiers include the sodium or potassium soaps of palmitic, margaric, stearic, palmitoleic and oleic acid, and the resin soaps (resinates), such as the sodium or potassium salts of ricinoleic, abietic and pimaric acid, etc. Potassium salt of tallow fatty acid or potassium oleate is the preferred emulsifier employed.

In some embodiments, the slurry comprises a chemical agglomerant. The presence of the chemical agglomerant in the slurry promotes larger agglomerates.

In some embodiments, the slurry is substantially free of chemical agglomerants. This avoids impurities that may affect the final properties of the core-shell copolymers made from the elastomer agglomerate composition. In these cases, preferably the amount of the chemical agglomerants being less than 0.01 wt % with respect to the total of the solids content in the slurry and any chemical agglomerants.

The term "chemical agglomerant" is herein meant as generally water-soluble or water-dispersible polymers based on hydrophilic monomers, such as polyacrylamide, polymethacrylamide, polyvinyl esters of $C_1$-$C_{18}$ carboxylic acids, examples being polyvinyl formate, polyvinyl acetate, polyvinyl propionate, polyvinyl n-butyrate, polyvinyl laurate and polyvinyl stearate, polyethers, such as polyalkylene glycols, and combinations thereof.

Slurry Temperature

The slurry provided in step (a) to be forced through an aperture in step (b) may have a temperature of more than 0° C. and less than 100° C., typically 10 to 90° C.

Preferably, the slurry provided in step (a) to be forced through an aperture in step (b) has a temperature of 40 to 80° C., preferably 45 to 80° C., more preferably 50 to 70° C.

The use of a slurry having such a relatively high temperature provides a pressure agglomeration method with a desirable particle size distribution which avoids the use of chemical agglomerants and impurities that may affect the final properties of the core-shell copolymers made from the elastomer agglomerate composition. It was surprisingly found that the use of a slurry having a temperature of 40 to 80° C. allows a broad operating window of the process for obtaining an elastomer agglomerate composition with a desirable particle size distribution.

Process

The slurry comprising the elastomer particles is forced through an aperture. By going through the aperture, the elastomer particles agglomerate to provide an elastomer agglomerate composition comprising elastomer agglomerates.

The aperture is comprised in a flow channel for the slurry provided by a valve and a seat that are arranged opposite each other of a valve assembly. The aperture is arranged at a sharp angle with respect to an axial center line of the valve in a cross sectional view of the valve assembly.

The slurry is forced through the aperture at a certain pressure. For example, the slurry may be forced through the aperture at a pressure of at least 400 bar, for example at least 500 bar, at least 600 bar, at least 700 bar or at least 800 bar. Particularly preferably, the slurry is forced through the aperture at a pressure of at least 850 bar, for example 400 to 1,500 bar, or 700 to 1200 bar, or 850 to 1000 bar.

The slurry may be forced through the aperture at a flow velocity of at least 3 meters per second (m/s), for example 5 to 15 m/s.

Preferably, the slurry is forced through the aperture at a flow velocity of at least 500 m/s, more preferably at least 600 m/s, more preferably at least 700 m/s, such as at least 500 and at most 1,000 m/s, or at least 700 m/s and at most 1,000 m/s.

Elastomer Agglomerate Composition

In order to achieve balanced flow/impact and other properties of the final core-shell copolymer, it is desired that the elastomer agglomerate composition has a relatively small portion of very small particles and a relatively small portion of very large particles.

For example, the volume fraction of particles with particle size smaller than 214 nanometers (nm) in the elastomer agglomerate composition is preferably relatively small. For example, the volume fraction of particles with particle size smaller than 214 nm in the elastomer agglomerate composition is at most 50%, more preferably at most 40%, even more preferably at most 30%, for example 10 to 30% or 20 to 30%. This leads to a better impact strength of the graft copolymer made using the elastomer agglomerate composition. This further improves the processing stability of the graft copolymers. As used herein particle size distribution is determined by a Beckman Coulter multi-wavelength laser diffraction particle size analyser type LS 13320 in accordance with ISO 13320.

For example, the volume fraction of particles with particle size larger than 868 nm in the elastomer agglomerate composition is preferably relatively small. For example, the volume fraction of particles with particle size larger than 868 nm in the elastomer agglomerate composition is at most 15%, more preferably at most 10%. This leads to a desirable melt flow of the graft copolymer produced using the elastomer agglomerates. This also avoids detrimental effect to the opacity of the graft copolymer.

In preferred embodiments, the volume fraction of particles with particle size smaller than 214 nm in the elastomer agglomerate composition is 10 to 30% or 20 to 30% and the volume fraction of particles with particle size larger than 868 nm in the elastomer agglomerate composition is at most 10%. Such composition demonstrates a desirable narrow particle size distribution that is beneficial for providing the desired material properties to the graft copolymer produced using the elastomer agglomerates, as well as for providing the desired processability properties.

Preferably, the elastomer agglomerates in the elastomer agglomerate composition have an average particle size of at least 150 nm, or at least 250 nm, such as at least 150 and at most 1,000 nm or at least 250 and at most 1,000 nm. More preferably, the elastomeric particles have an average particle size of at least 200 nm and at most 500 nm, or at least 250 nm and at most 400 nm. Such composition is beneficial for providing the desired material properties to the graft copolymer produced using the elastomer agglomerates, as well as for providing the desired processability properties.

The piston of FIG. 1 and the piston of FIGS. 2-5 were used for the process for the production of an elastomer agglomerate composition by forcing a slurry comprising polybutadiene particles through an aperture. Maintenance of the piston system of FIG. 1 was required after 2-3 days of operation. In contrast, maintenance of the piston system of FIGS. 2-5 was only required after 14 to 21 days of operation.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein. It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

Set forth below are some aspects of piston system, homogenizer, and methods disclosed herein.

Aspect 1: A piston system for use in a homogenizer (preferably a high-pressure homogenizer), comprising: a piston that is configured and arranged to make a reciprocating movement in use of the piston system, a cylinder that is configured and arranged to receive and guide at least a first part of the piston, a first supply channel that is configured and arranged to supply a lubricating medium to a portion of the first part of the piston that, in use, is arranged inside the cylinder, a second supply channel that is configured and arranged to, in use, supply a cooling medium to a second part of the piston while the second part of the piston is outside the cylinder.

Aspect 2: The piston system according to Aspect 1, further comprising a supply configured and arranged to supply elastomeric particles to a chamber of the piston system in communication with a third part of the piston, wherein, in use, movement of the piston into the chamber forces the slurry out of the chamber.

Aspect 3: The piston system according to Aspect 2, wherein the elastomeric particles are selected from the group consisting of polybutadiene particles, poly(styrene butadiene) particles, poly(acrylonitrile butadiene) particles and polybutylacrylate particles and combinations thereof, preferably the elastomeric particles comprise polybutadiene particles.

Aspect 4: The piston system according to any one of Aspects 2 or 3, wherein the slurry comprises at least 20 wt % of elastomeric particles, preferably tat least 20 wt % and at most 70 wt %, more preferably at least 30 wt % and at most 60 wt %, even more preferably at least 30 wt % and at most 50 wt %, based upon a total weight of the slurry.

Aspect 5: The piston system according to any one of aspects 2-4, wherein the elastomeric particles have an average particle size of at most 150 nm, preferably at most 130 nm, more preferably 80 to 120 nm, wherein the average particle size, $D_{50}$, is determined in accordance with ISO 9276-2:2014.

Aspect 6: The piston system according to any one of the preceding aspects, wherein the first supply channel comprises at least two inlet branches and wherein a first inlet branch of the at least two inlet branches is connected with a first lubricant supply system that is configured and arranged to enable manual supply of the lubricating medium.

Aspect 7: The piston system according to Aspect 6, wherein a second inlet branch of the at least two inlet branches is connected with a second lubricant supply system that is configured and arranged to enable automatic supply of the lubricating medium.

Aspect 8: The piston system according to any one of the preceding aspects, wherein the lubricant comprises grease.

Aspect 9: A homogenizer (preferably a high-pressure homogenizer) comprising at least one piston system according to any one of the preceding aspects.

Aspect 10: The high-pressure homogenizer of Aspect 9, wherein the homogenizer is configured to increase average particle size.

Aspect 11: The use of the piston according to any one of aspects 1-8 to form an elastomer agglomerate composition.

Aspect 12: A process for the production of an elastomer agglomerate composition comprising: introducing a slurry comprising elastomeric particles to a slurry chamber in the piston system according to any one of Aspects 1-8, and forcing the slurry through an aperture to obtain the elastomer agglomerate composition.

Aspect 13: The process according to Aspect 12, wherein the process is a continuous process.

Aspect 14: The process according to Aspect 12 or 13, wherein the elastomeric particles have an average particle size $D_{50}$ as determined in accordance with ISO 9276-2:2014, and wherein the elastomer agglomerate composition has agglomerates having a larger average particle size than the elastomeric particles average particle size.

Aspect 15: The process according to any one of Aspects 12-14, wherein the slurry comprises at least 20 wt % of elastomeric particles, preferably tat least 20 wt % and at most 70 wt %, more preferably at least 30 wt % and at most 60 wt %, even more preferably at least 30 wt % and at most 50 wt %, based upon a total weight of the slurry.

Aspect 16: The process according to any one of Aspects 12-15, wherein the elastomeric particles have an average particle size of at most 150 nm, preferably at most 130 nm, more preferably 80 to 120 nm, wherein the average particle size, $D_{50}$, is determined in accordance with ISO 9276-2: 2014.

Aspect 17: The process according to any one of Aspects 12-16, further comprising lubricating the piston with a lubricating medium while in the cylinder and cooling the system with a cooling medium applied outside of the cylinder.

Aspect 18: The process according to Aspect 17, wherein the lubricating medium is different from the cooling medium.

Aspect 19: The process according to any one of Aspects 17-18, wherein the lubricating medium is grease and the cooling medium comprises water.

The terms "a" and "an" and "the" do not denote a limitation of quantity, and are to be construed to cover both the singular and the plural, unless otherwise indicated herein or clearly contradicted by context. "Or" means "and/or" unless clearly indicated otherwise by context. Unless defined otherwise, technical and scientific terms used herein have the same meaning as is commonly understood by one of skill in the art to which this invention belongs. A "combination" is inclusive of blends, mixtures, alloys, reaction products, and the like. "One or more of the foregoing" means at least one of the listed material. All amounts total 100 wt %. All ranges disclosed herein are inclusive of the endpoints, and the endpoints are independently combinable with each other.

As used herein, "high-pressure" refers to a pressure of greater than 4,500 pounds per square inch (psi) (310 bar), e.g., 4,500 to 10,500 psi (310 to 724 bar).

Unless specified to the contrary herein, all test standards are the most recent standard in effect as of the filing date of this application, or, if priority is claimed, the filing date of the earliest priority application in which the test standard appears.

All cited patents, patent applications (including any priority application), and other references are incorporated herein by reference in their entirety. However, if a term in the present application contradicts or conflicts with a term in the incorporated reference, the term from the present application takes precedence over the conflicting term from the incorporated reference. The present application claims priority to EP Application No. 1 720 372, which is incorporated herein by reference.

What is claimed is:

1. A piston system for use in a homogenizer, comprising:
   a piston that is configured and arranged to make a reciprocating movement in use of the piston system,
   a cylinder that is configured and arranged to receive and guide at least a first part of the piston,
   a first supply channel that is configured and arranged to supply a lubricating medium to a portion of the first part of the piston that, in use, is arranged inside the cylinder, and
   a second supply channel that is configured and arranged to, in use, supply a cooling medium to a second part of the piston while the second part of the piston is outside the cylinder,
   wherein the cooling medium comprise water.

2. The piston system of claim 1, further comprising a chamber in communication with a third part of the piston, wherein the piston is configured to force a slurry out of an aperture of the chamber.

3. The piston system of claim 1, further comprising a supply configured and arranged to supply elastomeric particles to a chamber of the piston system in communication with a third part of the piston, wherein, in use, movement of the piston into the chamber forces the slurry out of an aperture of the chamber.

4. The piston system of claim 3, wherein the elastomeric particles are selected from the group consisting of polybutadiene particles, poly(styrene butadiene) particles, poly(acrylonitrile butadiene) particles and polybutylacrylate particles and combinations thereof.

5. The piston system of claim 4, wherein the elastomeric particles comprise polybutadiene particles.

6. The piston system of claim 3, wherein the slurry comprises at least 20 wt % of elastomeric particles, based upon a total weight of the slurry.

7. The piston system of claim 6, wherein the slurry comprises at least 30 wt % and at most 50 wt % of elastomeric particles, based upon a total weight of the slurry.

8. The piston system of claim 3, wherein the elastomeric particles have an average particle size of at most 150 nm, wherein the average particle size, D50, is determined in accordance with ISO 9276-2:2014.

9. The piston system of claim 8, wherein the elastomeric particles have an average particle size of 80 to 120 nm, wherein the average particle size, D50, is determined in accordance with ISO 9276-2:2014.

10. The piston system of claim 1, wherein the first supply channel comprises at least two inlet branches and wherein a first inlet branch of the at least two inlet branches is connected with a first lubricant supply system that is configured and arranged to enable manual supply of the lubricating medium.

11. The piston system of claim 10, wherein a second inlet branch of the at least two inlet branches is connected with a second lubricant supply system that is configured and arranged to enable automatic supply of the lubricating medium.

12. The piston system of claim 1, wherein the lubricating medium comprises grease.

13. The piston system of claim 1, wherein the cooling medium is not part of a closed system.

14. The piston system of claim 1, wherein the lubricating medium is grease.

15. The piston system of claim 1, wherein both the lubricating medium and cooling medium comprise water.

16. A high-pressure homogenizer comprising at least one piston system of claim 1.

17. A process for increasing a particle size of elastomeric particles, the process comprising:
   providing a slurry comprising the elastomeric particles in water; and
   forcing the slurry through an aperture in a piston system to obtain the elastomer agglomerate composition,
   wherein the piston system comprises:
   a piston that is configured and arranged to make a reciprocating movement in use of the piston system,
   a cylinder that is configured and arranged to receive and guide at least a first part of the piston,
   a first supply channel that is configured and arranged to supply a lubricating medium to a portion of the first part of the piston that, in use, is arranged inside the cylinder, and
   a second supply channel that is configured and arranged to, in use, supply a cooling medium to a second part of the piston while the second part of the piston is outside the cylinder.

18. The process according to claim 17, wherein the elastomeric particles have an average particle size D50 as determined in accordance with ISO 9276-2:2014, and wherein the elastomer agglomerate composition has agglomerates having a larger average particle size than the elastomeric particles average particle size.

* * * * *